United States Patent [19]

Bauer et al.

[11] Patent Number: 4,977,205

[45] Date of Patent: Dec. 11, 1990

[54] ASBESTOS-FREE MATERIAL FOR USE AS SEALING, DAMPING AND/OR SEPARATING ELEMENT

[75] Inventors: Gerhard Bauer, Neuenmarkt; Reinhard Rödel, Hof/Saale, both of Fed. Rep. of Germany

[73] Assignee: Frenzelit-Werke GmbH & Co. KG, Bad Berneck Frankenhammer, Fed. Rep. of Germany

[21] Appl. No.: 260,725

[22] Filed: Oct. 21, 1988

[30] Foreign Application Priority Data

Mar. 31, 1988 [WO] PCT Int'l Appl. .................. PCT/EP88/00267

[51] Int. Cl.⁵ .......................... C08F 9/00; C08K 3/04
[52] U.S. Cl. ................................. 524/496; 524/449; 524/451; 524/526
[58] Field of Search ............... 524/496, 497, 449, 451, 524/526, 521, 575

[56] References Cited

U.S. PATENT DOCUMENTS

| | | | |
|---|---|---|---|
| 4,176,097 | 11/1979 | Fox et al. | 524/34 |
| 4,330,442 | 5/1982 | Lindeman et al. | 524/16 |
| 4,725,650 | 2/1988 | Landi | 524/496 |
| 4,761,451 | 8/1988 | Moteki | 524/496 |

FOREIGN PATENT DOCUMENTS

| | | |
|---|---|---|
| 166376 | 1/1986 | European Pat. Off. . |
| 2037343A | 7/1980 | United Kingdom . |
| 2118985A | 11/1983 | United Kingdom . |

Primary Examiner—Christopher Henderson
Attorney, Agent, or Firm—Venable, Baetjer, Howard and Civiletti

[57] ABSTRACT

The invention relates to an asbestos-free material for use as sealing, damping and/or separating element comprising an elastomer matrix which apart from the usual process fibers and elastic binders include lamellar inorganic material in an amount of 10 to 60% by weight with respect to the total mass.

8 Claims, 2 Drawing Sheets

——— CONVENTIONAL ASBESTOS-FREE MATERIAL
— — — ASBESTOS-FREE MATERIAL ACCORDING TO THE INVENTION

○○○ KNOWN ASBESTOS-FREE MATERIAL

)))) IT MATERIAL ACC. TO DIN 3754

⌬ NOVEL ASBESTOS-FREE MATERIAL ACCORDING TO THE INVENTION

↑↑↑ PRODUCTION DIRECTION

⌒ CRACK PATHS OF THE INDIVIDUAL MATERIALS

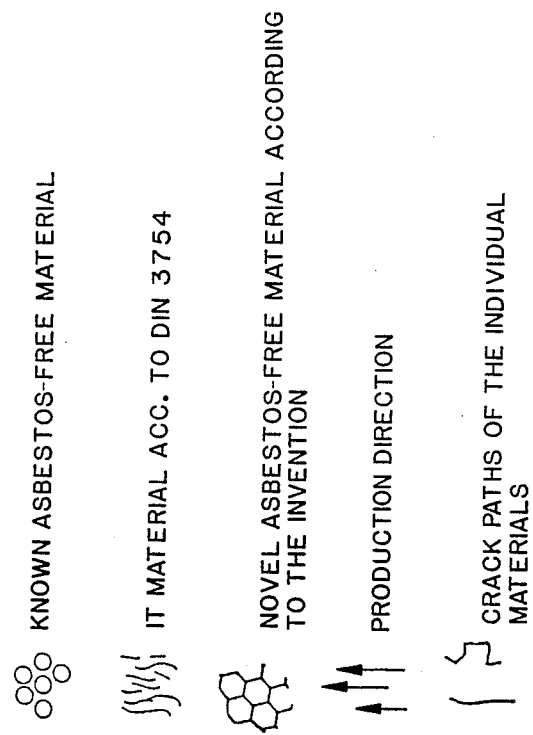
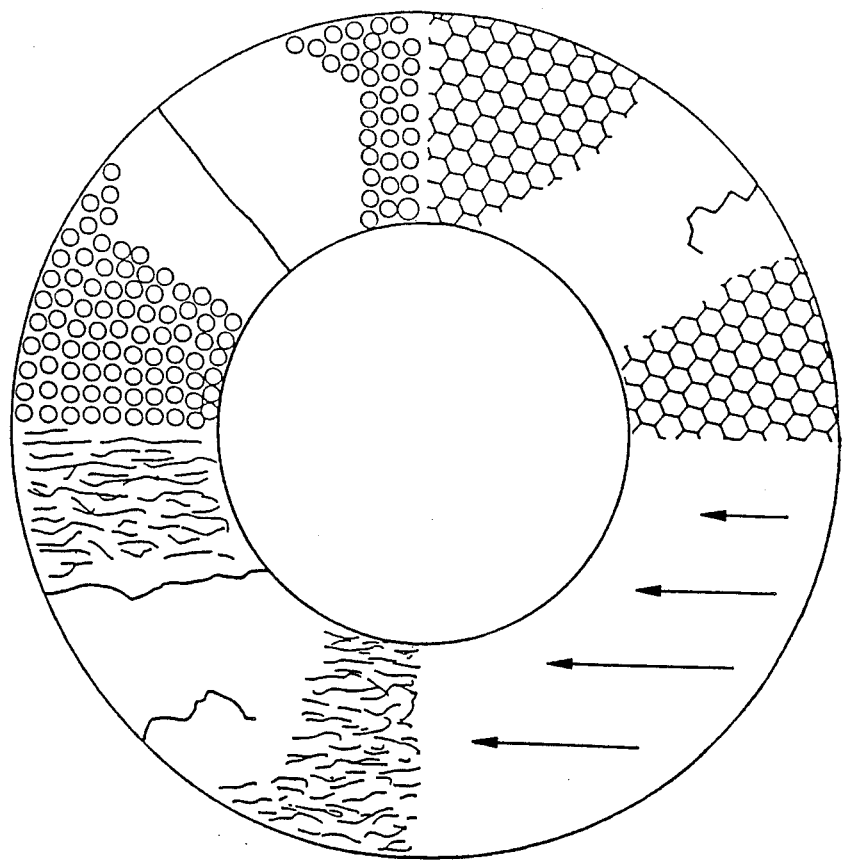
FIG. 2

ASBESTOS-FREE MATERIAL FOR USE AS SEALING, DAMPING AND/OR SEPARATING ELEMENT

BACKGROUND OF THE INVENTION

Composite materials composed of asbestos bound in an elastomeric matrix exhibit compensating effects even after stressing of the elastomeric binders under high energetic loads, for example thermal, mechanical or acoustic loads, or under alternating loads. Due to the well-known health hazard of asbestos dust, the asbestos in these composite materials must be replaced.

Hitherto known and available asbestos-free composite materials for use as sealing, damping and/or separating element do not have the compensating effects of asbestos composite materials. The resulting problems when asbestos-free composite materials are used can only be solved with great constructional or financial expenditure. For example, flat seals used in the apparatus and conduits of various technologies are frequently subjected to high pressures and high temperature. This applies for example in particular in the steam range. As a result of these stresses due to alternating loads, dynamic forces and moments occur locally even in so-called static sealing connections. If there is no possibility in the sealing material to take up these local forces and moments and/or divert them or distribute them (i.e. if the material has no compensating effects) failure of the material occurs which can lead to breakage.

It is thus desirable to have asbestos-free materials with compensating effects, i.e. materials which do not exhibit brittle material behavior but elastic or plastic behavior or hybrid forms thereof.

SUMMARY OF THE INVENTION

It has now been found that by binding specific lamellar inorganic materials into the elastomeric matrix of asbestos-free composite materials the effects peculiar to asbestos can be simulated in the composite material. This is no doubt due to the mutually displaceable laminate planes of such lamellar substances.

It has additionally been found that the directional dependence of the compensating effect present in materials on an asbestos basis, in particular in materials made by the calendering method, do not occur in the compositions according to the invention containing these lamellar substances. Forces and movements can thus be equally well taken up, compensated and/or diverted independently of the direction.

DETAILED DESCRIPTION OF THE INVENTION

Figure 1:
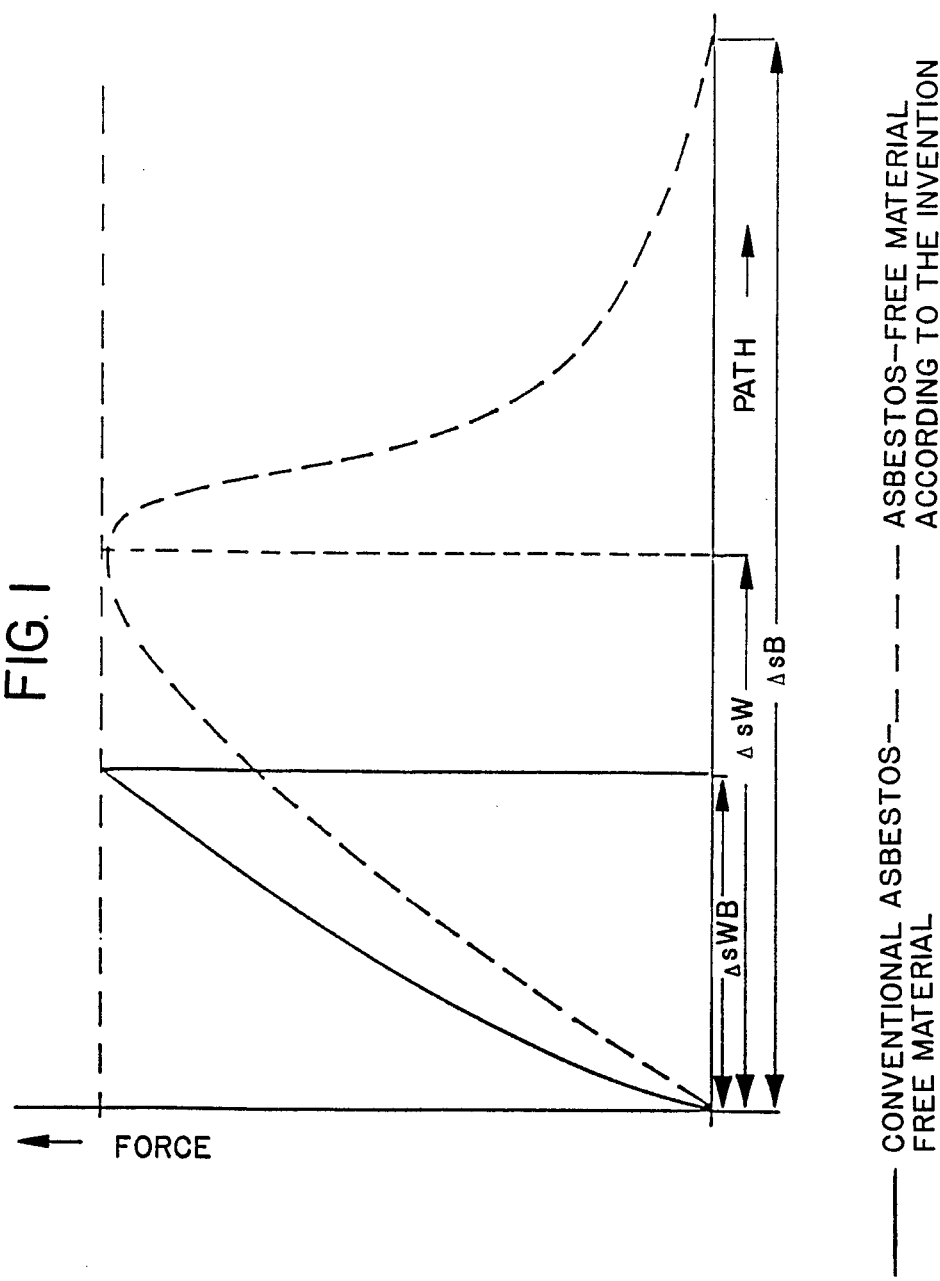
FIG. 1 shows the breakage behavior of the asbestos-free material which contains lamellar inorganic material according to the invention compared with a conventional asbestos-free material and, FIG. 2 shows the different breakage behavior of known asbestos-free material, It material (i.e. asbestos material) and the material according to the invention with regard to a sealing ring as example.

Accordingly, the subject of the invention is asbestos-free materials for use as sealing, damping and/or separating elements which, apart from the process fibers known as asbestos-substitutes and possibly other reinforcement material and the binders usual for such sealing materials, contain lamellar components in an amount of 10 to 70% by weight, preferably 10 to 60% by weight, and for particular purposes, depending on the need, in particular 25 to 45% by weight, for example 25 to 30 or 30 to 35% by weight, or if higher amounts are desired, which is very advantageous in many cases, 25 to 60% by weight, in particular 30 to 50% by weight. The latter higher contents are particularly advantageous when the laminar component is lamellar graphite and also when the laminar component is a talc.

As process and reinforcing fibers the usual asbestos substitutes may be used, preferably aramides. The amount of fiber is generally 5 to 30% by weight, preferably 6 to 15% by weight, with respect to the final composition.

The binders usual for seals or gaskets are employed as elastic binders, for example all sulphur-curable and peroxide-curable elastomers. The amount of binder is 5 to 20% by weight, preferably 8 to 12% by weight, with respect to the final composition.

In addition, there are the usual amounts of vulcanizing agents (with activators and antiaging agents), generally in about the same amount as the binders. Moreover, the fillers usual in such materials can be additionally employed.

Particular lamellar components that can be mentioned include flake graphite, talc, and mica-like laminate silicates. Flake graphite is particularly preferred. The essential point is that the material is a lamellar material with laminate structure, the flakes being displaceable with respect to each other. The amount of this lamellar material is always related to the total mixture without solvent. It is to be assumed that substantially this amount is then also present in the finished composite material, as for example in the seal.

In the journal Kunststoffbersater 9 (1971), page 808 and 810, fillers are described for high polymers, in particular mica and talc are mentioned. This does not however relate to composite materials with process fibers, i.e, not to asbestos substitute materials, but relates to the filling of high polymers without fibre additions, apart from the case where asbestos itself is shown as filler. It is stated that in most polymer/filler combinations the polymer proportion is at least 60% to obtain adequate flowability in the processing but special uses are also referred to, for example a quartz epoxy resin combination with 60% filler. These are two-component resin/filler systems and not multicomponent systems resin/process fibers/lamellar filler and possibly/further filler.

The size distribution of the lamellar material to be used according to the invention, in a typical case, for flake graphite is 50 to 250 $\mu$m, in particular 80 to 200 $\mu$m flake size. The flake should, in any case, be larger than the thickness of the mixture layer applied in a calendar rotation, which is 5 to 15 $\mu$m depending on the calendering pressure and viscosity. Thus, when the flake size becomes smaller, the viscosity of the mixture should be made somewhat smaller and the calendering pressure increased so that the layer applied also becomes thinner. Preferably, the flake size should be at least twice as great as the layer thickness applied.

In the case of talc, types of talc with a medium grain size, around 30 to 150 $\mu$m, are therefore to be preferred. For example, talc types having a grain size distribution of about 30 to 300 $\mu$m are available commercially.

The general rule in the case of flake graphite and in the case of talc when used in the calendering method is that flake sizes or grain sizes preferably be around 80 to 200 μm while when used on a paper machine that a smaller flake or grain sizes be used preferably around 50 to 100 μm, and more especially 50 to 80 μm, are preferred. The grain and flake sizes specified always represent the mean size because of course both graphite and talc are present in a fairly wide grain distribution.

The presence of flakes of suitable size distribution, in particular 50 to 200 μm, has an additional inhibiting effect on the crack progression when microcracks occur under load. Moreover, the stability of seals containing such lamellar components is increased.

Furthermore, lamellar fillers with mutually displaceable laminate planes enable sonic waves to be specifically absorbed or diverted and thus composite materials with these fillers can be used to provide an acoustic separation of rooms or a shift of sound from the audible to the non-audible range.

When these lamellar filled composite materials are used as separating elements, the sliding properties of the flakes play a part in providing the good qualities of the composite material.

The attached Figures show the properties of the material according to the invention compared with conventional asbestos-free material and compared with It material, i.e. asbestos-containing material.

As apparent from FIG. 1, the force-displacement path in the breakage test shows the more elastic behavior of the novel material according to the invention compared with the brittle behavior of conventional asbestos-free material in which an abrupt breakage occurs at the load limit.

FIG. 2 shows the more favorable behavior of the material according to the invention in regard to crack propagation. Whereas in known asbestos-free materials when local overloading occurs the resulting crack runs beyond the load point up to the material end, in the material according to the invention this crack terminates on reaching areas which are not overloaded, irrespective of the production direction of the material. This effect also manifests itself in asbestos-containing material (It material) but because of the fibre orientation in this case weakens in the production direction which manifests itself in the breakage, lying fairly exactly in the fibre direction, extending from the outside to the inside through the entire seal whereas the breakage starting transversely to the production direction bends into the production direction and then terminates.

The material according to the invention thus has advantages over conventional asbestos-free material on the one hand and furthermore certain advantages in technical behavior even over It material, in addition to the freedom from asbestos.

The following examples will explain the invention.
Production examples for making include:
1 It 400 (as comparison material)
2. new product according to the invention made on a calender (NPK) and
3. new product according to the invention made on a paper machine (NPP).

The following descriptions of the production process for the material on an asbestos basis, in the present case It 400, applies correspondingly to the production process of asbestos-free material as well except that the composition is changed accordingly.

(1) The Making Of It Seals By the Calendering Method.

It seals (known in the art as CAF seals = compressed asbestos fibre sheets) are made by a calendering method. For this purpose about 65-90% asbestos fibers are kneaded into dissolved or swollen elastomers until a highly pasty to granulate-like mixture is made which mixture may also contain the corresponding additives such as vulcanizing processing aids and the like. The mixing times depend greatly on the machine and may be 5 minutes to 3 hours, depending on the mixing technique. This composition is vulcanized on the so-called "It" calenders at about 130° C. to sheets of the corresponding thickness. The particular feature of this method or materials is that an "endless laminate" is made. It vulcanizes against the pressure of the cooled roller depending on the rotation of the heated roller in a layer about 5-15 μm thick. The fibrous materials used for this purpose must therefore be fine and insensitive to shearing. To compensate the pronounced lengthwise orientation lateral branchings should be present.

(2) An Example of The Making of Dissolved or Swollen Elastomers For It Seals.

The following applies to the practical execution of this method, which is well known in the art:

The rubber is granulated in usual manner in rubber mills. The rubber granulate is swollen corresponding to the particular quantity ratios for about 24 hours in swelling containers with solvent, the solvent employed generally being toluene in an amount of 3 l toluene to 1 kg rubber. The rubber is then introduced into suitable mixers, usually plough blade mixers, and after about 5-minute mixing the fibers (previously comminuted in known manner with chopping tools, fillers and vulcanizing agents) are gradually added within about a further 10 minutes. Mixing is then continued for another 45 minutes and if necessary further solvent added until the working consistence is reached, admixing once again about 3 l toluene per 1 kg rubber.

With this mode of operation and when using this type of mixture, the mixer is stopped after about 1-hour total mixing time and the finished mixture is ready for further processing on the calender.

(3) The Making of Seals On Paper Machines.

Beater seals (beater addition asbestos fibre sheets) are made on paper machines from an aqueous suspension of fibers which mat together on drying. To obtain a number of contact points between the individual fibers adequate for the cohesion in the paper sheet, the surface of said fibers must be enlarged by fibrillation. In the material preparation, the fibers (dry component 60-98%) and additives are dispersed in water. The sheet formation of the paper starts with the running of the aqueous material suspension onto the endless horizontally moving screen. The screen length (15-40 m) depends on the nature and thickness of the paper and on the operating speed. The paper web is here dehydrated and is supplied to the couch press, where the dehydration and compacting is continued until the web is self-supporting for a short time without stacking. After 98% of the total water amounts have been withdrawn within the wire section, the web runs through the pressing section to the drying section in which a further water extraction and the vulcanization at 130° C. take place. This is followed by cooling, glazing and coiling. The production method achieves a homogeneous distribution of fibers and binder; no orientation takes place and the material thickness is formed by the matting in one application without counter pressure. The fibrous materials should be fibrillatable, dispersable in water and correspondingly electrochemically chargeable.

EXAMPLE 1

Compressed Asbestos Fiber Sheets Made By Calendering Method

Hereinafter the composition is given for Example 1. It 400 material
10% elastomer (2% NR, 6% NBR, 2% SBR)
80% asbestos 5 D (typical fibre length 2 mm)
10% vulcanization agent (ZnO, suplhur, mercapto accelerator, antiaging agent)

This composition is processed using the calendering method described above. All sulphur-curable and/or peroxide-curable elastomers may be employed as binders.

The test data are set forth in Table 1.

EXAMPLE 2

The New Product of the Invention (NBK) Made by Calendering Method

Hereinafter the composition is given for Example 2.

| 10% | Elastomer | (2% NR, 6% NBR, 2% SBR) |
|---|---|---|
| 30% | Flake graphite | (typical flake size 100 $\mu$m) |
| 15% | Aramide fibers | (typical fiber length 2 mm) |
| 10% | Vulcanization Agent | (ZnO, sulphur, mercapto) accelerator, antiaging agent) |
| 35% | Fillers | (active: silicic acid 10%, semi-active: kieselguhr 20%, inactive: BaSo4 5%) |

In this case the binders used are all sulphur-curable and/or peroxide-curable elastomers. The processing is on the calender described as for It material.

EXAMPLE 3

Material of the Invention (NPP) Made on a Paper Machine

Hereafter the composition of the material according to the invention made on a paper machine is given:

| 8% | Latex | (4% SBR, 4% NBR) |
|---|---|---|
| 42% | Flake graphite | (typical flake size 60 $\mu$m) |
| 10% | Aramide fibers | (typical fiber length 2 mm) |
| 10% | Vulcanization agent | (ZnO, sulphur, mercapto) accelerator, antiaging agent |
| 30% | Fillers | (active: silic acid 15%, semi-active: kieselguhr 15%) |

In this case, the binders that may be employed are all sulphur-curable and/or peroxide-curable elastomers.

The processing is on the paper machine as described above.

The test data are summarized in Table 1.

The dimensions of the specimens are standardized in accordance with the particular test according to DIN, i.e.:

Tensile strength according to DIN 52910 (here the tensile transverse stress is given)

Compressive creep strength according to DIN 52913 at 50 N/mm2 and 300° C. after 16 hours.

Compressibility and recovering according to ASTM F36 method A Gas tightness based on DIN 35 35, Part 4, but with apparatus-specific pressures of 80 N/mm$^2$ and temperatures of 300° C.

TABLE 1

Material characteristics for IT 400 according to DIN 3754 (comparison), new product according to the invention made on the calender (NPK) and new product according to the invention made on the paper machine (NPP) in comparison

|  | IT 400 | NPK | NPP |
|---|---|---|---|
| Tensile strength N/mm$^2$ | 21 | 13 | 10 |
| Compressive creep strength N/mm$^2$ | 30 | 35 | 20 |
| Compressibility % | 5–15 | 7–17 | 10 |
| Recovery % | 40 | 50 | 40 |
| Gas tightness ml/min | 2 | 2 | 5 |
| Density p/cm$^2$ | 1.8–2.0 | 1.35–1.55 | 1.3–1.5 |
| Thickness of the investigated specimens: | 2 mm if not otherwise stipulated by test requirement | | |

The values show that although the new material has a lower tensile strength than It 400, the other values of the new material are comparable to those of IT 400. Since however the tensile strength is of no importance as regards the problem to be solved the new material is at least equivalent to the asbestos material (IT 400) as regards the data of significance here.

FIGS. 1 and 2 show the further advantages of the material compared with known asbestos-free material and (FIG. 2) also compared with It material.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed:

1. An asbestos-free material useful for making, sealing, damping and/or separating elements comprising elastomer, process fibers, flake graphite, and fillers wherein the amount of said elastomer is from about 5% to about 20% by weight based on the solvent-free weight of said material; wherein the flake size of said flake graphite is in the range of 50 $\mu$m to 250 $\mu$m; and wherein the amount of said flake graphite is from about 10% to about 70% by weight based on the solvent-free weight of said material.

2. The material of claim 1 wherein the amount of said flake graphite is from about 10% to about 60% based on the solvent-free weight of said material.

3. The material of claim 1 wherein the amount of said process fibers is from about 5% to about 30% based on the solvent-free weight of said material; wherein the amount of said elastomer is from about 5% to about 20% based on the solvent-free weight of said material; wherein the amount of said flake graphite is from about 10% to about 60% based on the solvent-free weight of said material.

4. The material of claim 1 wherein said process fibers are aramide fibers.

5. The material of claim 1 wherein said elastomer is selected from a group consisting of sulphur-curable elastomers, peroxide-curable elastomers or mixtures thereof.

6. The material of claim 1 wherein the amount of said flake graphite is from about 25% to about 60% based on the solvent-free weight of said material.

7. An asbestos-free material useful for making, sealing, damping and/or separating elements comprising elastomer, process fibers, flake graphite and fillers wherein based on the solvent-free weight of said material the weight amount of said elastomer is from about 5 to about 20%, the weight amount of said fiber is 6–15%, and the weight amount of said graphite is from about 25% to about 60%; and wherein the flake size of said flake graphite is in the range of from 80μ to 200μm.

8. The asbestos-free material of claim 7 wherein said fiber comprises aramide fiber.

* * * * *